March 21, 1961 J. HANSEN 2,975,631
SOFTNESS GAGE FOR BAKERY PRODUCTS
Filed March 3, 1958
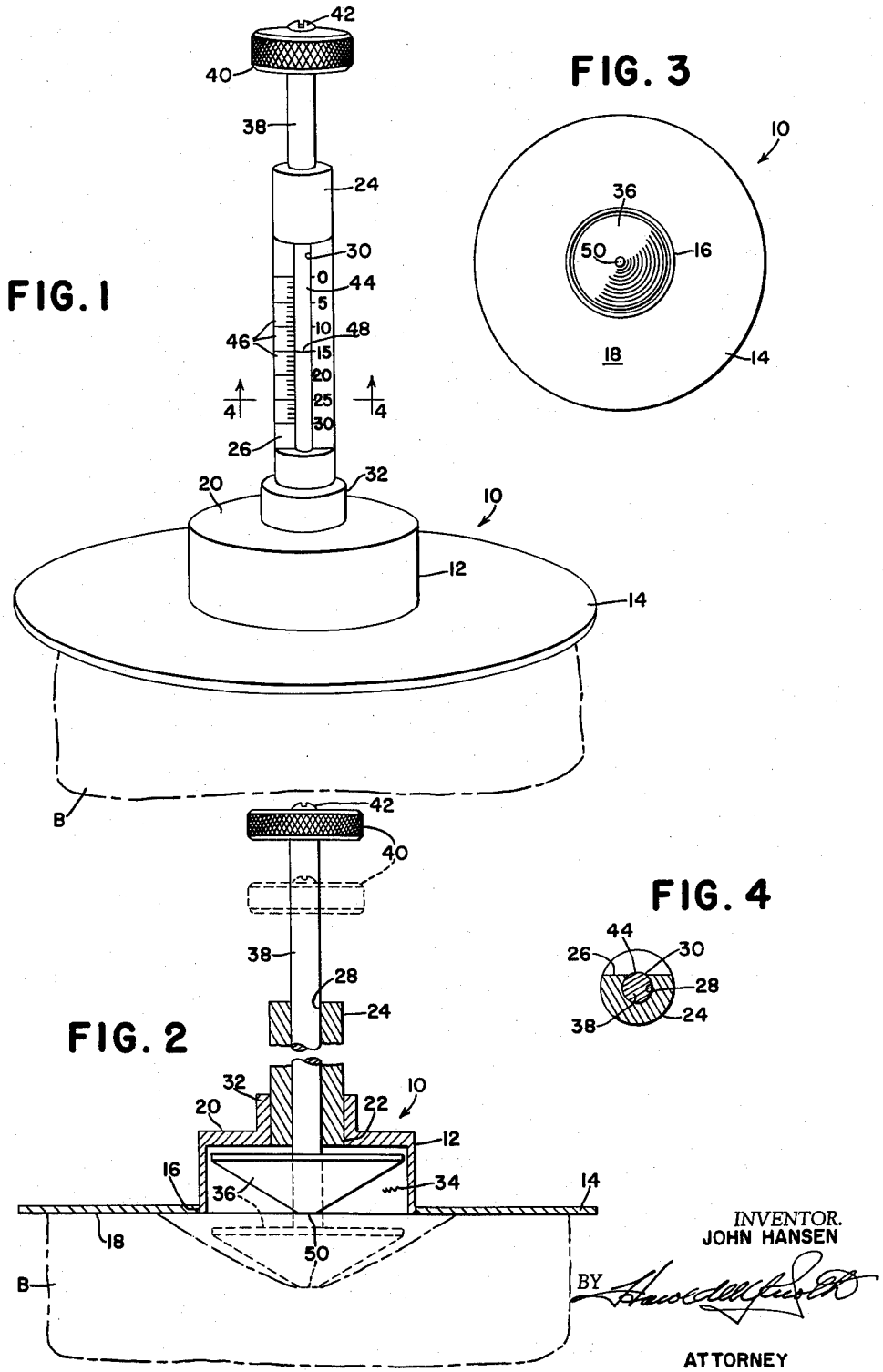
INVENTOR.
JOHN HANSEN
BY
ATTORNEY

2,975,631
SOFTNESS GAGE FOR BAKERY PRODUCTS

John Hansen, 710 River Drive, Bettendorf, Iowa

Filed Mar. 3, 1958, Ser. No. 718,544

3 Claims. (Cl. 73—81)

This invention relates to a measuring instrument and more particularly to a gage for measuring the softness or texture resistance of a bakery product, especially bread.

As is known, many factors affect the texture or softness of bread and much effort has been expended in the direction of providing increased softness and fineness of texture, since this appears to be desired by the majority of consumers of bread. In order that the desired softness may be maintained uniformly from batch to batch in the bakery, periodic tests should be made, and if the desired result is not being obtained, correction must be effected. However, periodic testing has heretofore been quite unreliable and in most cases uninformative, since, in the case of bread, the best test results are obtained on finished or baked loaves, from which little can be told as to softness except by feel and guesswork.

According to the present invention, an accurate testing procedure may be followed by the use of a novel softness gage involving gravitational penetration of the baked bread by a weight which exerts a pressure resisted in varying amounts by the texture of the bread. Means is provided for reading the amount of penetration or descent of the weight and in this way a selected standard may be adopted and adhered to, thus insuring that all bread produced by a certain bakery, for example, is uniform as to type and softness. It is a feature of the invention to provide a simple and low-cost gage that is accurate, easy to use and having extremely long life and continuing accuracy primarily because it involves only a few basic parts not subject to wear.

The foregoing and other important objects and desirable features inherent in and encompassed by the invention will become apparent as a preferred embodiment thereof is disclosed by way of example in the ensuing description and accompanying sheet of drawings, the figures of which are described below.

Figure 1 is a perspective of the instrument.
Figure 2 is a vertical section through the same.
Figure 3 is a reduced bottom view.
Figure 4 is a section on the line 4—4 of Figure 1.

The gage or instrument comprises a base member 10 made up of an inverted preferably cylindrical cup 12 to the lower marginal edge of which a flat base plate or flange 14 is rigidly joined. The plate is preferably circular and has a central opening 16 in register with and receiving the peripheral edge of the cup 12 so as to facilitate the rigid joint between the two. The plate, being flat, has a flat undersurface 18 which is adapted to rest on and be supported by a bakery product, here represented by a part-loaf of baked bread B. In the case of sliced bread, several horizontal slices will be used in a stack. Where the bread is unsliced, the loaf may be cut across its length to afford an upper horizontal surface on which the gage rests.

The inverted cup 12 has an integral circular top wall 20 provided with a central aperture 22 which receives the lower end of an upright coaxial sleeve 24. The sleeve is primarily cylindrical but has a flat 26 at one side thereof which cuts the bore 28 of the sleeve to provide an upright side opening 30 for purposes to presently appear. The top wall 20 is annularly thickened at 32 to afford a better rigid joint with the lower end of the sleeve 24.

The inverted cup 12 establishes a cylindrical downwardly opening pocket 34 in which a coaxial weight element 36 is loosely housed when in the full-line position shrown in Fig. 2 and a coaxial stem 38 is rigidly secured to the top of the weight and extends upwradly through and is vertically slidably carried in the bore 28 of the sleeve 24. The free upper end of the stem carries a knurled knob 40, removably retained by a screw 42, which serves as a handle as well as a stop for preventing downward separation of the stem and weight from the base 10. Because of the side opening 30 in the sleeve 24, a portion of the stem 38 is exposed at 44, and this portion and the bordering parts of the flat 26 carry cooperative indicia, including graduations 46 on the latter and a single annular index mark 48 on the former. The graduations are preferably in millimeters and the flat may also include numerals as shown. These are of course details that could be varied.

The weight 36 is in the form of a cone having its apex disposed downwardly slightly flat at 50, which does not exclude other shapes, as will presently appear.

In use, the gage is supported on the bread B as shown in Figures 1 and 2. On a hard flat surface, the weight 36 has its apex flat 50 coplanar with the undersurface 18 of the plate 14. When the gage is being placed on the bread, the user may grasp the knob 40 as he sets the gage down and when he releases the knob the weight 36 will descend by gravity (dotted lines, Figure 2) into the bread. The amount of descent will be determined by the resistance of the load to the pressure of the weight and this can be read at the indicia 46—48. A standard of softness indication has been established in distance in millimeters. For example, as shown in dotted lines in Figure 2, penetration or descent has occurred to the extent of fifteen millimeters as read at 46—48. Hence, the bread here has a softness of 15. The reading is normally obtained almost instantaneously.

The shape of the weight 36 has been designed to develop a measurable penetration of the bread, particularly since it is capable of exerting minor lateral forces. The entire gage is simple and compact and is of such design as to lend itself to production methods. The knob 40 may be removed via the screw 42 so that the weight and stem may be withdrawn downwardly. The materials used in the gage are preferably anodized aluminum, stainless steel and brass and thus are corrosive-resistant, easy to clean and require no lubrication.

Other features will readily occur to those versed in the art, as will modifications of the preferred example disclosed, all without departure from the spirit and scope of the invention.

What is claimed is:

1. An instrument for measuring the softness of a bakery product such as bread and the like, comprising: a base member in the form of an inverted cup having a marginal flat horizontal flange of substantial area adapted to overlie the product and affording a broad undersurface adapted to rest freely on the product so that said instrument is supported directly on the product independently of additional support, said inverted cup providing a downwardly opening pocket and further having a top wall apertured in alinement with said pocket; a weight element housed in said pocket and vertically movable therein for descent by gravity into the product on which the base member is supported so as to measure the softness of the product according to the resistance of the substance of the product to the descent of the weight; a stem secured to and rising from the weight through said apertured top wall of the inverted cup; a sleeve secured to and rising from said top wall and vertically slidably carrying the stem, said sleeve having an opening through its side wall to expose a portion of the stem; a stop on the upper end of the stem engageable with the top of the sleeve to prevent complete downward separation thereof from the sleeve; said weight element affording a stop for the lower end of the stem preventing upward separation of the stem from the sleeve and said stem being otherwise freely vertically slidable and independent of restriction against descent of the weight element; and indicia in part on the portion of the stem exposed through the side opening in the sleeve and in part on the sleeve adjacent to said side opening and cooperative to afford a reading of the amount of descent of the weight element.

2. The invention defined in claim 1, in which: the bottom of the weight element converges downwardly.

3. The invention defined in claim 1, in which: the inverted cup is cylindrical so that the pocket is cylindrical, and the weight element is generally in the form of a cone having its apex downwardly to facilitate penetration of the product, the angle of the elements of the cone to the axis of the cone being relatively large so that the altitude of the cone is small compared to the diameter of its base whereby the cone in penetrating the product exerts only minor lateral forces.

References Cited in the file of this patent

UNITED STATES PATENTS

| | | |
|---|---|---|
| 2,347,082 | Claus | Apr. 18, 1944 |
| 2,656,715 | Tolman | Oct. 27, 1953 |

FOREIGN PATENTS

| | | |
|---|---|---|
| 329,629 | Great Britain | May 19, 1930 |
| 719,678 | Germany | Apr. 20, 1942 |
| 880,987 | France | Jan. 15, 1943 |
| 903,602 | France | Jan. 22, 1945 |
| 820,815 | Germany | Nov. 12, 1951 |